(No Model.) 2 Sheets—Sheet 1.
J. N. McGRIFF.
CORN PLANTER.
No. 363,407. Patented May 24, 1887.
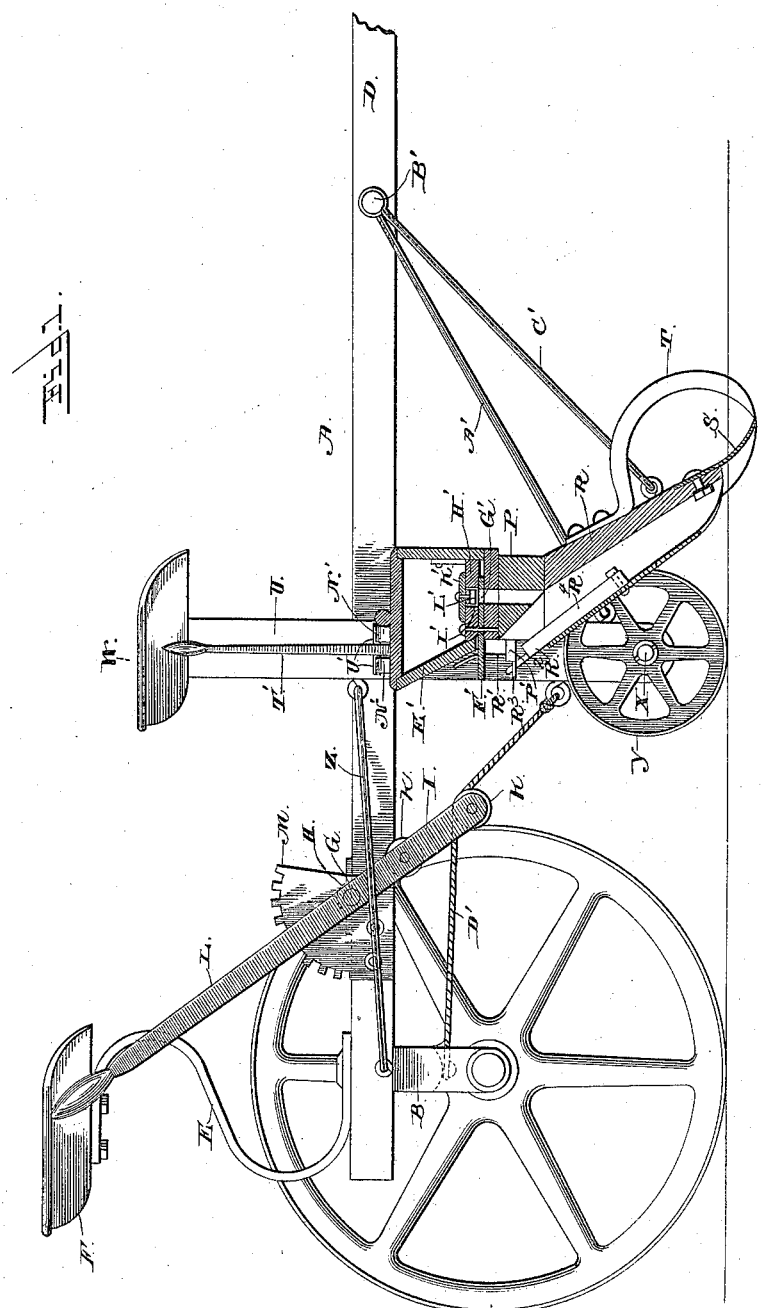
Witnesses
M. E. Fowler
J. W. Gardner
Inventor
John N. McGriff
By his Attorneys
C. A. Snow & Co.
N. PETERS, Photo-Lithographer, Washington, D. C.

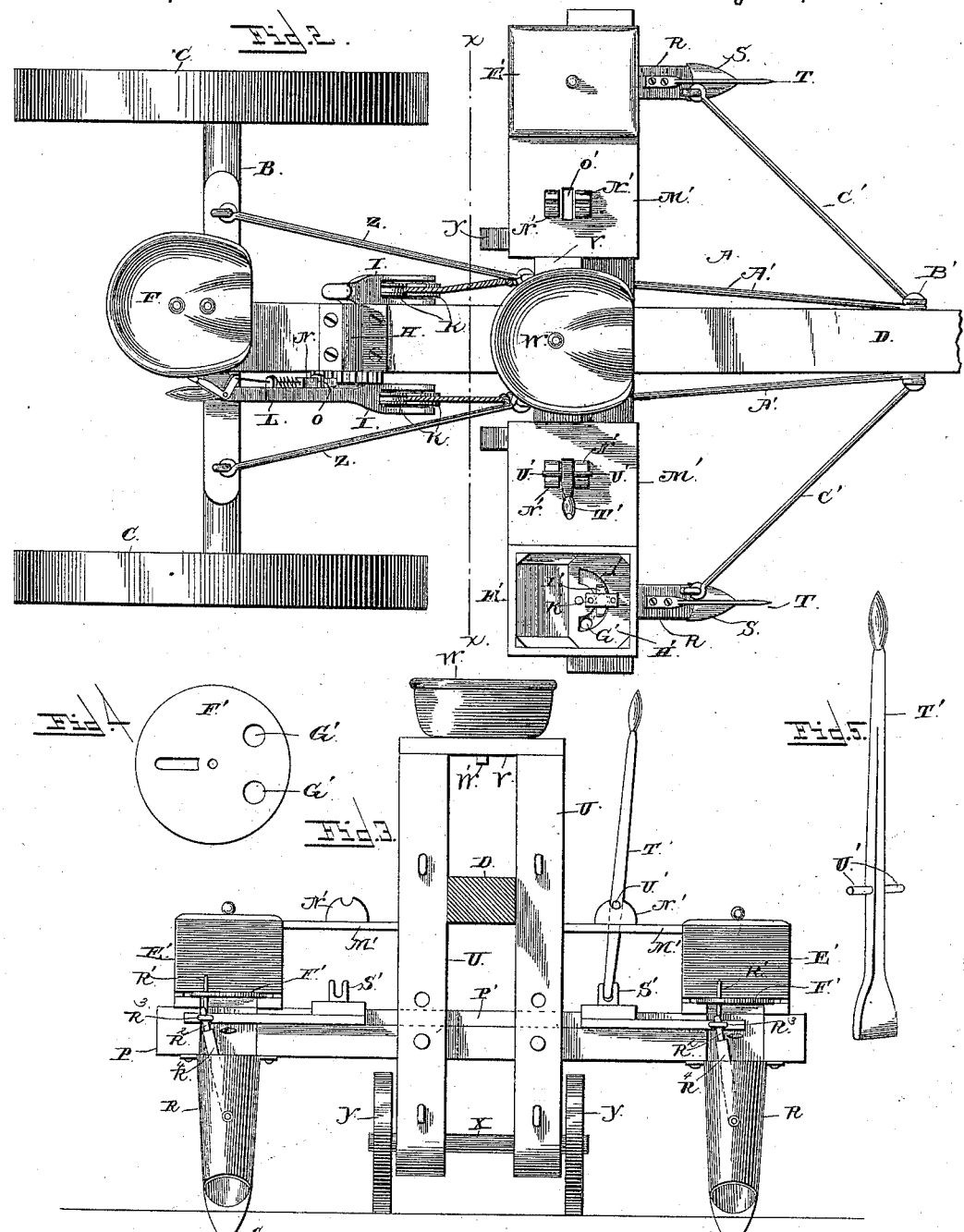

UNITED STATES PATENT OFFICE.

JOHN N. McGRIFF, OF ANDERSON, INDIANA.

CORN-PLANTER.

SPECIFICATION forming part of Letters Patent No. 363,407, dated May 24, 1887.

Application filed December 8, 1886. Serial No. 220,998. (No model.)

*To all whom it may concern:*

Be it known that I, JOHN N. MCGRIFF, a citizen of the United States, residing at Anderson, in the county of Madison and State of Indiana, have invented a new and useful Improvement in Corn-Planters, of which the following is a specification.

My invention relates to an improvement in corn-planters; and it consists in the peculiar construction and combination of devices, that will be more fully set forth hereinafter, and particularly pointed out in the claims.

In the drawings, Figure 1 is a side elevation, partly in section, of a corn-planter embodying my improvements. Fig. 2 is a top plan view of the same. Fig. 3 is a vertical transverse sectional view taken on the line $x\ x$ of Fig. 2. Figs. 4 and 5 are detailed views.

A represents a sulky or truck, comprising an arched axle, B, supporting-wheels C, which are journaled on the spindles of the said axle, and a tongue, D, which is attached to the center of the axle and projects from the front side thereof. On the upper side of the tongue, immediately over the axle, is secured a spring-bar, E, which carries a seat, F, for the driver.

G represents a transverse rock-shaft, which is journaled to the box H on the upper side of the tongue, just in front of the axle B, and to the ends of the said rock-shaft are attached depending arms I, which are slotted, and in the said slots are journaled anti-friction rollers K. From the upper ends of one of the arms I projects a hand-lever, L.

M represents a segment-plate, which is rigidly attached to one side of the tongue, and is provided with a series of peripheral notches. A gravity-bolt, N, is connected to the hand-lever by means of keepers O, and the said bolt is adapted to engage the teeth of the segment-plate, so as to lock the lever L thereto at any desired inclination.

P represents the cross-bar, which is provided near its extremities with depending seed-spouts R. To the lower ends of the said spouts, on the front sides thereof, are secured furrow-opening shovels S, and to the front ends of the said seed-spouts are also attached forwardly-extending curved cutters T, the function of which is to cut the soil in advance of the furrow-openers and to cause the latter to rise should they encounter an obstruction, and thus enable them to clear the same. To the rear side of the cross-bar, near the center thereof, is attached a pair of vertical bars or standards, U, which extend on opposite sides of the tongue. The upper ends of the said standards are connected by a yoke, V, and to the center of the said yoke is attached a circular seat, W, which carries a depending central pin, W', that passes through a vertical opening made in the center of the yoke, and thereby the said seat is free to turn thereon. The lower ends of the standards U are connected by an axle, X, upon the spindles of which are journaled supporting-wheels Y.

Z represents a pair of brace-rods which have their rear ends pivoted to the axle B near the ends thereof, and their front ends pivoted near the upper ends of the standards U.

A' represents a pair of brace-rods which have their upper ends pivoted on a transverse bolt, B', that extends through the tongue at a suitable distance in front of the cross-bar, and the rear ends of the said brace-rods A' are connected to the lower ends of the standards U. Similar brace-rods, C', have their upper ends attached to the bolt B' and their rear ends connected to the seed-spouts.

From the foregoing description it will be understood that the cross-bar, with its standards, is connected flexibly to the tongue and to the rear axle, B, so that the said cross-bar is drawn under the tongue and in advance of the axle B.

Elevating chains or cords D' connect the lower ends of the standards U with the axle B, and the said chains pass over the rollers or sheaves in the lower ends of the arms I. On the upper side of the cross-bar P, at each end thereof, is located a hopper, E', the discharge-opening in the bottom of which communicates with the upper ends of the seed-spouts.

F' represents seed-disks, which are journaled on the bottoms of the hoppers, and are provided with openings G', forming seed-cups. Plates H' are placed in the bottoms of the hoppers on the upper sides of the seed-disks, and the said plates are provided with curved slotted openings I', with which the openings in the seed-disks register. Across the center of each opening I' extends a bar, K', the under side of which is provided with a brush or cut-off, L', that bears upon the seed-disk and over the discharge-opening in the bottom of the hopper. Arms or wings M' extend from the upper side of the hoppers to the adjacent standards U, and are provided on their upper sides, at their centers, with bearing-lugs N'. Openings O' are made between the said lugs.

P' represents a slide-bar, which is guided in a groove made in the rear upper side of the cross-bar. The ends of the said slide-bar are provided with vertical arms R', which enter slots that are made in the rear sides of the seed-disks, so that when the said slide-rod is reciprocated an oscillating motion is imparted to the seed-disks, and thereby the latter are turned first in one direction and then in the other to cause their openings G' to alternately register with the discharge-openings in the hoppers, so that the seeds which are placed in the said hoppers will be fed into the seed-spouts, and thereby conveyed to the furrows. In each seed-spout is pivoted a valve, R⁴, having the upwardly-extending arms R², which are connected to the ends of the slide-bar by means of keepers R³.

From the upper side of the slide-bar, near the ends thereof, project notched plates S'. T' represents a hand-lever having projecting trunnions U', that are adapted to bear in the lugs N'. The lower end of the said hand-lever passes through one of the openings O', and engages one of the notched plates S', and thereby a person seated upon the seat W can grasp the lever T' and move the same, so as to reciprocate the slide-rod, and thereby simultaneously operate the seed-disks and the valves to cause the seeds to be discharged from the hoppers into the furrows. The wheels C align with the furrow-openers, and are provided with broad treads, and thereby the said wheels form rollers, which cover the seeds as they are dropped in the furrows. The supporting-wheels Y prevent the furrow-openers from cutting too deeply into the ground.

While the machine is in operation in a field the driver sits upon the seat F and manages the team with one hand, while with the other he operates the lever L. Another person, seated on the seat W, operates the lever J'. When the machine reaches the end of a row and it becomes necessary to turn, the hand-lever T' is released and the driver grasps the lever L and forces the same rearwardly, thereby causing the rocking arms I to tighten upon the chains or cords D' and lift the cross bar, with its supporting-wheels and furrow-openers, until the latter are above the ground. As soon as the machine is ranged in position parallel with the rows which have been planted, the lever L is moved forwardly, so as to lower the supporting-wheels Y and the furrow-openers to the ground, the team is started, and the operation before described is then repeated.

When the machine is being driven along the road and is not in operation, the planting mechanism is elevated so as to raise the furrow-openers and the supporting-wheels Y above the ground, and the driver sits upon the seat F.

It will be observed that the seat W is supported entirely by the planting mechanism, so that the weight of the person thereon is not thrown upon the tongue, but is borne by the wheels Y and the furrow-openers, and thus the latter are caused to operate in the furrow.

Having thus described my invention, I claim—

1. In a planter, the combination of the sulky having the tongue with the planting mechanism having the furrow-openers and the supporting-wheels, and the rods flexibly connecting the said planting mechanism to the tongue and the sulky, whereby the planting mechanism may move vertically independently of the sulky, substantially as described.

2. The combination of the sulky having the tongue with the planting mechanism having the furrow-openers and the vertical standards U on opposite sides of the tongue, the rods flexibly connecting the planting mechanism to the tongue, and the rods flexibly connecting the standards U to the sulky, substantially as described.

3. The combination of the sulky having the tongue and the levers pivoted thereto, the planting mechanism having the furrow-openers and the supporting-wheels and flexibly connected to the tongue, and trailed thereby in advance of the sulky, and the chains connecting the planting mechanism and the sulky and engaged by the levers pivoted to the tongue, substantially as described.

4. The combination of the sulky having the tongue, the planting mechanism flexibly connected to the tongue and the sulky, the levers pivotally mounted upon the tongue and carrying rollers in their lower ends, and chains or cords connecting the planting mechanism to the sulky and passing over the rollers carried by the levers, substantially as set forth.

In testimony that I claim the foregoing as my own I have hereto affixed my signature in presence of two witnesses.

JOHN N. McGRIFF.

Witnesses:
ARTH L. BRANSON,
GEORGE ROSS.